United States Patent
Chen et al.

(10) Patent No.: US 8,483,271 B2
(45) Date of Patent: Jul. 9, 2013

(54) METHOD AND SYSTEM FOR 3D VIDEO PRE-PROCESSING AND POST-PROCESSING

(75) Inventors: Xuemin Chen, Rancho Santa Fe, CA (US); Wade Wan, Orange, CA (US)

(73) Assignee: Broadcom Corporation, Irvine, CA (US)

( * ) Notice: Subject to any disclaimer, the term of this patent is extended or adjusted under 35 U.S.C. 154(b) by 253 days.

(21) Appl. No.: 12/874,848

(22) Filed: Sep. 2, 2010

(65) Prior Publication Data

US 2011/0274157 A1 Nov. 10, 2011

Related U.S. Application Data

(60) Provisional application No. 61/332,064, filed on May 6, 2010.

(51) Int. Cl.
| | |
|---|---|
| *H04N 7/12* | (2006.01) |
| *H04N 7/32* | (2006.01) |
| *H04N 11/02* | (2006.01) |
| *H04N 13/00* | (2006.01) |

(52) U.S. Cl.
USPC ............ 375/240.02; 375/240.13; 375/240.25; 375/240.26; 375/240.29; 348/42; 348/43

(58) Field of Classification Search
USPC .............. 375/240.02, 240.25, 240.26, 240.29
See application file for complete search history.

(56) References Cited

U.S. PATENT DOCUMENTS

| | | | | |
|---|---|---|---|---|
| 2008/0165848 | A1* | 7/2008 | Ye et al. .................... | 375/240.13 |
| 2010/0165077 | A1* | 7/2010 | Yin et al. .......................... | 348/42 |
| 2010/0260268 | A1* | 10/2010 | Cowan et al. ............. | 375/240.25 |
| 2012/0026288 | A1* | 2/2012 | Tourapis et al. ................ | 348/43 |
| 2012/0027079 | A1* | 2/2012 | Ye et al. .................... | 375/240.02 |
| 2012/0033040 | A1* | 2/2012 | Pahalawatta et al. ........... | 348/43 |
| 2012/0092452 | A1* | 4/2012 | Tourapis et al. ................ | 348/43 |
| 2012/0092453 | A1* | 4/2012 | Suh ................. | 348/43 |

* cited by examiner

*Primary Examiner* — Joseph Ustaris
*Assistant Examiner* — On S Mung
(74) *Attorney, Agent, or Firm* — Thomas|Horstemeyer

(57) ABSTRACT

A 3-dimensional (3D) video transmitter may be operable to determine a modification process to be utilized for modifying an enhancement layer of a 3D video frame before encoding of the enhancement layer. The modification process may provide increased compression efficiency during the encoding. The enhancement layer may be modified utilizing the determined modification process. The modified enhancement layer may then be encoded by the 3D video transmitter. The 3D video transmitter may transmit the encoded base layer and the encoded enhancement layer as well as modification information associated with the modified enhancement layer to a 3D video receiver. The 3D video receiver may decode the transmitted encoded base layer and the transmitted encoded enhancement layer. The 3D video receiver may then modify the decoded enhancement layer, based on the transmitted modification information, so as to recover an original image of the enhancement layer of the 3D video frame.

23 Claims, 6 Drawing Sheets

METHOD AND SYSTEM FOR 3D VIDEO PRE-PROCESSING AND POST-PROCESSING

CROSS-REFERENCE TO RELATED APPLICATIONS/INCORPORATION BY REFERENCE

This patent application makes reference to, claims priority to, and claims benefit from U.S. Provisional Application Ser. No. 61/332,064, which was filed on May 6, 2010.

The above stated application is hereby incorporated herein by reference in its entirety.

FIELD OF THE INVENTION

Certain embodiments of the invention relate to video processing. More specifically, certain embodiments of the invention relate to a method and system for 3D video pre-processing and post-processing.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV (DTV), a 3D video is often desirable because it is often more realistic to viewers than the 2D counterpart. A 3D video comprises a left view video and a right view video. A 3D video frame may be produced by combining left view video components and right view video components.

Various video encoding standards, for example, MPEG-1, MPEG-2, MPEG-4, H.263, H.264/MPEG-4 advanced video coding (AVC), multi-view video coding (MVC) and scalable video coding (SVC), have been established for encoding digital video sequences in a compressed manner. For example, the MVC standard, which is an extension of the H.264/MPEG-4 AVC standard, may provide efficient coding of a stereoscopic 3D video. The SVC standard, which is also an extension of the H.264/MPEG-4 AVC standard, may enable transmission and decoding of partial bitstreams to provide video services with lower temporal or spatial resolutions or reduced fidelity, while retaining a reconstruction quality that is similar to that achieved using the H.264/MPEG-4 AVC.

Most TV broadcasts, and similar multimedia feeds, utilize video formatting standard that enable communication of video images in the form of bitstreams. For example, a bitstream may be a transport stream (TS) which may comprise one or more elementary streams (ES). Packets in the same elementary stream all have the same packet identifier (PID). These video standards may utilize various interpolation and/or rate conversion functions to present content comprising still and/or moving images on display devices.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for 3D video pre-processing and post-processing, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for 3D video pre-processing and post-processing. In various embodiments of the invention, a 3-dimensional (3D) video transmitter may be operable to determine a modification process to be utilized for modifying an enhancement layer of a 3D video frame before encoding of the enhancement layer of the 3D video frame. The modification process may provide increased compression efficiency during the encoding. The enhancement layer of the 3D video frame may be modified by the 3D video transmitter utilizing the determined modification process. The modified enhancement layer of the 3D video frame may then be encoded by the 3D video transmitter. In this regard, the modification process for the enhancement layer of the 3D video frame may be determined based on, for example, video information associated with the enhancement layer of the 3D video frame and/or coding information associated with an encoded base layer of the 3D video frame.

In an exemplary embodiment of the invention, the 3D video transmitter may be operable to determine one or more filters to be utilized on one or more regions of the enhancement layer of the 3D video frame. The one or more regions of the enhancement layer of the 3D video frame may then be modified by the 3D video transmitter utilizing the determined one or more filters. In this regard, for example, the one or more filters to be utilized on the one or more regions of the enhancement layer may be determined based on video information associated with each of the one or more regions of the enhancement layer. The one or more filters to be utilized on the one or more regions of the enhancement layer may also be determined based on coding information associated with each of the one or more corresponding regions of the encoded base layer of the 3D video frame.

The 3D video transmitter may be operable to transmit the encoded base layer of the 3D video frame and the encoded enhancement layer of the 3D video frame to a 3D video receiver. The 3D video transmitter may also be operable to transmit modification information associated with the modified enhancement layer of the 3D video frame to the 3D video receiver. In this regard, the 3D video receiver may decode the transmitted encoded base layer and the transmitted encoded enhancement layer of the 3D video frame. The 3D video receiver may then modify the decoded enhancement layer of the 3D video frame, based on the transmitted modification information, so as to recover an original image of the enhancement layer of the 3D video frame.

Figure 1:
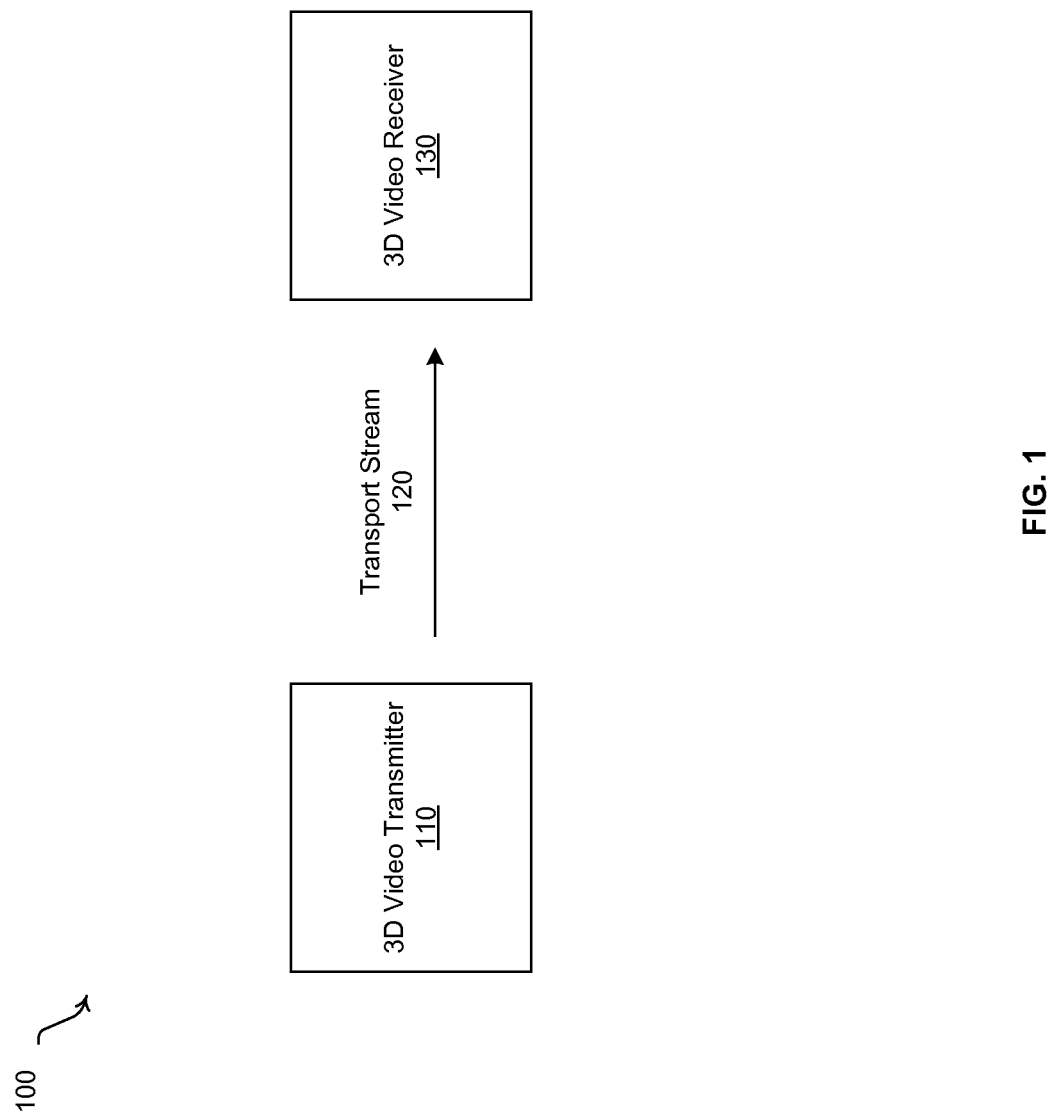
FIG. 1 is a block diagram illustrating an exemplary video communication system that is operable to provide 3D video pre-processing and post-processing, in accordance with an embodiment of the invention.

FIG. 1 is a block diagram illustrating an exemplary video communication system that is operable to provide 3D video pre-processing and post-processing, in accordance with an embodiment of the invention. Referring to FIG. 1, there is shown a video communication system 100. The video communication system 100 may comprise a 3D video transmitter 110, a transport stream 120 and a 3D video receiver 130.

The 3D video transmitter 110 may comprise suitable logic, circuitry, interfaces and/or code that may be operable to distribute encoded or compressed 3D video content to the 3D video receiver 130 via a bitstream such as the transport stream 120. The 3D video transmitter 110 such as, for example, a headend system may be operable to provide various services such as, for example, distribution, multicast, and/or quality of service necessary for a reliable and timely transmission of the compressed 3D video content to the 3D video receiver 130. The 3D video transmitter 110 may utilize, for example, a cable TV network, a satellite broadcasting network, the Internet protocol (IP) data network such as the Internet, and/or a wireless communication network for delivery of services or the compressed 3D video content to the 3D video receiver 130. The 3D video may be encoded or compressed using, for example, a MVC method or a SVC method, and transmitted to the 3D video receiver 130 via the transport stream 120. A 3D video may comprise a base layer video and an enhancement layer video for processing or encoding by the 3D video transmitter 110. The base layer video and the enhancement layer video may be dependently encoded on each other or independently encoded of one another, for example.

The 3D video receiver 130 may comprise suitable logic, circuitry, interfaces and/or code that may be operable to receive the compressed 3D video via a bitstream such as the transport stream 120 from the 3D video transmitter 110. The 3D video receiver 130 such as, for example, a set-top box (STB) may be operable to decode or decompress the received compressed 3D video to generate a decompressed 3D video using, for example, a MVC method or a SVC method.

In operation, the 3D video transmitter 110 may be operable to determine a modification process to be utilized for modifying an enhancement layer of a 3D video frame before encoding the enhancement layer of the 3D video frame so as to, for example, increase compression efficiency during the encoding. The enhancement layer of the 3D video frame may be modified, by the 3D video transmitter 110, before the encoding of the enhancement layer, utilizing the determined modification process. The modified enhancement layer of the 3D video frame may then be encoded by the 3D video transmitter 110. The compression efficiency may be considered increased or improved when lower bit rate is achieved while keeping the same picture quality level such as the picture sharpness level, for example. The compression efficiency may also be considered increased or improved when higher picture quality level such as higher picture sharpness level is achieved while keeping the same bit rate, for example. The increased compression efficiency may be identified by comparing certain encoding value associated with an encoding of a modified enhancement layer with that value associated with the encoding of an unmodified enhancement layer. For example, in instances when a ratio of a bit rate associated with the encoding of the modified enhancement layer to a bit rate associated with the encoding of the unmodified enhancement layer is smaller than 1, while the picture sharpness levels are kept the same, then the compression efficiency may be considered increased. In instances when a ratio of a picture sharpness level associated with the encoding of the modified enhancement layer to a picture sharpness level associated with the encoding of the unmodified enhancement layer is greater than 1, while the bit rates are kept the same, then the compression efficiency may be considered increased. In this regard, for example, the modification process may comprise one or more filters which may be employed to filter one or more portions of the enhancement layer. A filter may be determined so as to allow lower bit rates while keeping the same picture quality level such as the sharpness level during the encoding of the enhancement layer, for example.

The modification process for the enhancement layer of the 3D video frame may be determined based on, for example, video information associated with the enhancement layer of the 3D video frame and/or coding information associated with an encoded base layer of the 3D video frame. In this regard, for example, a particular filter may be determined based on the video itself of the enhancement layer. For example, in instances when the video of the enhancement layer may comprise a lot of high frequency content, the enhancement layer may not be filtered strongly or may not be filtered so as to preserve the content. The coding information associated with the encoded base layer may comprise, for example, the video itself of the encoded base layer and/or coefficients and/or parameters that may be utilized to encode the base layer. Based on how the base layer is encoded according to the associated coding information such as, for example, a syntax in the base layer, a particular filter may also be determined to filter the enhancement layer so as to increase compression or coding efficiency during encoding of the enhancement layer, for example.

In an exemplary embodiment of the invention, the 3D video transmitter 110 may be operable to determine one or more filters to be utilized on one or more regions of the enhancement layer of the 3D video frame. In this regard, the one or more regions may comprise a plurality of macroblocks, for example. The one or more regions of the enhancement layer of the 3D video frame may then be modified by the 3D video transmitter 110 utilizing the determined one or more filters. In this regard, for example, the one or more filters to be utilized on the one or more regions of the enhancement layer may be determined based on video information associated with each of the one or more regions of the enhancement layer. The one or more filters to be utilized on the one or more regions of the enhancement layer may also be determined based on coding information associated with each of the one or more corresponding regions of the encoded base layer of the 3D video frame. In this regard, for example, different filters may be employed for different regions of the enhancement layer based on the video associated with each of the regions and/or the video of each of the corresponding regions of the encoded base layer. The different filters may comprise filters that range from very aggressive filters that smooth the video image a lot to filters that may not change or modify the video image, or filters that may make only slight modifications to the video image, for example.

The 3D video transmitter 110 may be operable to transmit the encoded base layer of the 3D video frame and the encoded enhancement layer of the 3D video frame to a 3D video receiver such as the 3D video receiver 130 via a transport stream such as the transport stream 120. The 3D video transmitter 110 may also be operable to transmit modification information associated with the modified enhancement layer of the 3D video frame to the 3D video receiver 130. For example, the modification information may comprise information associated with different filters which may be applied to different regions of the enhancement layer. The information associated with the different filters may comprise, for example, filter types and/or filter coefficients. In this regard, the 3D video receiver 130 may decode the transmitted encoded base layer and the transmitted encoded enhancement layer of the 3D video frame. The 3D video receiver 130 may then modify the decoded enhancement layer of the 3D video frame, based on the transmitted modification information, so as to recover an original image of the enhancement layer of the 3D video frame.

In an embodiment of the invention, the original enhancement layer, the modified enhancement layer and the base layer of the 3D video frame may comprise the same resolution or format. In another embodiment of the invention, the original enhancement layer, the modified enhancement layer and the base layer of the 3D video frame may comprise different resolutions or formats.

Figure 2:
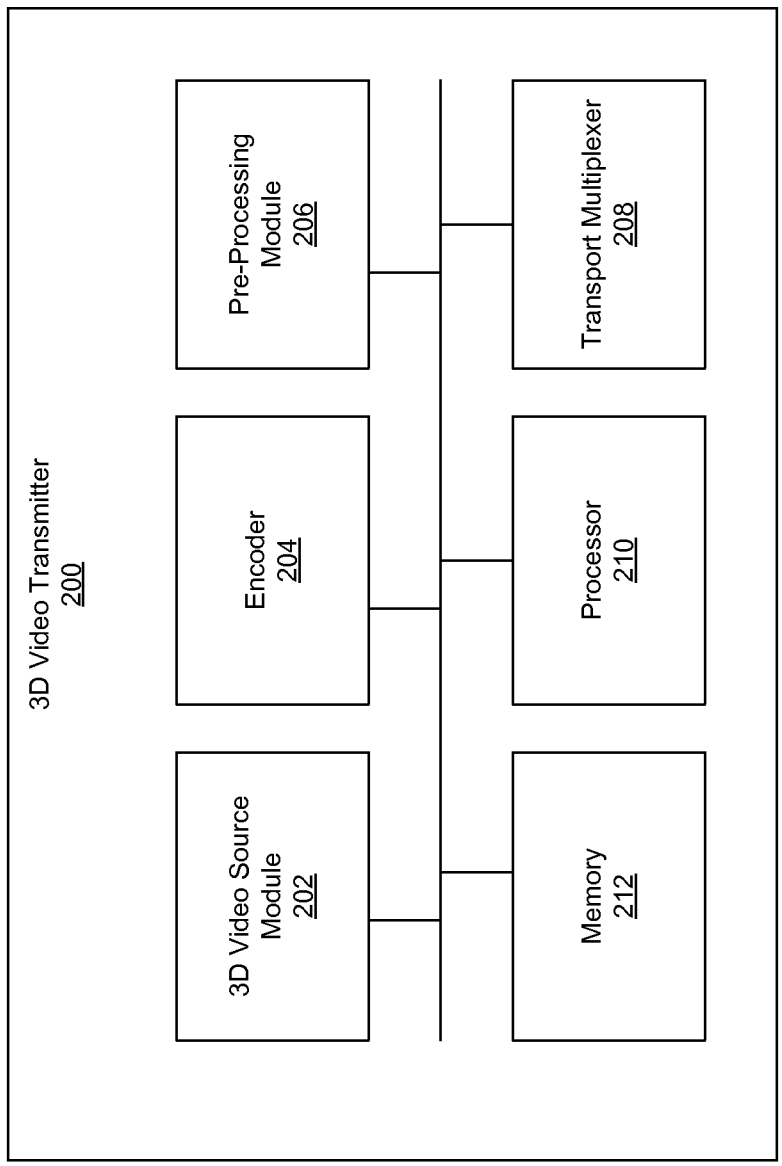
FIG. 2 is a block diagram illustrating an exemplary 3D video transmitter that is operable to provide 3D video pre-processing and post-processing, in accordance with an embodiment of the invention.

FIG. 2 is a block diagram illustrating an exemplary 3D video transmitter that is operable to provide 3D video pre-processing and post-processing, in accordance with an embodiment of the invention. Referring to FIG. 2, there is shown a 3D video transmitter 200. The 3D video transmitter 200 may comprise a 3D video source module 202, an encoder 204, a pre-processing module 206, a transport multiplexer 208, a processor 210 and a memory 212.

The 3D video source module 202 may comprise suitable logic, circuitry, interfaces and/or code that may be operable to capture and/or generate source 3D video content. The 3d video source module 202 may be operable, for example, to generate stereoscopic 3D video comprising such as left view and right view video data from the captured source 3D video content. The left view video and the right view video may be communicated to the encoder 204 and/or the pre-processing module 206 via a base layer video and an enhancement layer video for further processing and/or video encoding. For example, the base layer video may comprise the left view video while the enhancement layer video may comprise the right view video.

The encoder 204 may comprise suitable logic, circuitry, interfaces and/or code that may be operable to receive 3D video content from the 3D video source module 202 and/or from the pre-processing module 206 for video encoding. For example, the encoder 204 may be operable to encode the base layer which may be received from the 3D video source module 202 and encode a modified enhancement layer which may be received from the pre-processing module 206.

The pre-processing module 206 may comprise suitable logic, circuitry, interfaces and/or code that may be operable to modify an enhancement layer of a 3D video frame before encoding of the enhancement layer by the encoder 204. In an exemplary embodiment of the invention, the pre-processing module 206 may be operable to determine a modification process for the enhancement layer of the 3D video frame before encoding of the enhancement layer of the 3D video frame so as to, for example, increase compression efficiency during the encoding. The enhancement layer of the 3D video frame may be modified by the pre-processing module 206, before the enhancement layer is encoded, utilizing the determined modification process such as, for example, one or more filters. The modified enhancement layer of the 3D video frame may then be encoded by the encoder 204.

The transport multiplexer 208 may comprise suitable logic, circuitry, interfaces and/or code that may be operable to merge a plurality of encoded or compressed video sequences or streams into a single combined video stream or bitstream for transmission to a 3D video receiver such as the 3D video receiver 130 via the transport stream 120. The combined video stream may comprise an encoded base layer bitstream and an encoded enhancement layer bitstream.

The processor 210 may comprise suitable logic, circuitry, interfaces and/or code that may be operable to communicate with the 3D video source module 202, the pre-processing module 206, the encoder 204 and the transport multiplexer 208 to perform various functions of the 3D video transmitter 200.

The memory 212 may comprise suitable logic, circuitry, interfaces and/or code that may be operable to store information such as executable instructions and data that may be utilized by the processor 210, the 3D video source module 202, the pre-processing module 206, the encoder 204 and/or the transport multiplexer 208 to perform various functions of the 3D video transmitter 200.

In operation, the encoder 204 may be operable to receive a base layer of a 3D video frame from the 3D video source module 202. The received base layer may be encoded by the encoder 204. The pre-processing module 206 may be operable to receive an enhancement layer of the 3D video frame from the 3D video source module 202. In an exemplary embodiment of the invention, the pre-processing module 206 may be operable to determine a modification process to be utilized for modifying the enhancement layer of the 3D video frame before the enhancement layer of the 3D video frame is encoded. This may provide increased compression efficiency during the encoding. The pre-processing module 206 may modify the enhancement layer of the 3D video frame prior to encoding of the enhancement layer. The modification may be done utilizing one or more filters, which may have been derived from the determined modification process. The modified enhancement layer of the 3D video frame may then be encoded by the encoder 204. In this regard, the modification process such as, for example, a particular filter to be utilized on the enhancement layer of the 3D video frame may be determined based on, for example, video information associated with the enhancement layer of the 3D video frame and/or coding information associated with the encoded base layer of the 3D video frame.

In an exemplary embodiment of the invention, the pre-processing module 206 may be operable to determine one or more filters to be utilized on one or more regions of the enhancement layer of the 3D video frame. The one or more regions may comprise, for example, a plurality of macroblocks. The pre-processing module 206 may be operable to utilize the determined one or more filters to modify the one or more regions of the enhancement layer of the 3D video frame. The one or more filters to be utilized on one or more regions of the enhancement layer may be determined based on video information that is associated with each of the one or more regions of the enhancement layer. The one or more filters to be utilized on one or more regions of the enhancement layer may also be determined based on coding information associated with each of the one or more corresponding regions of the encoded base layer of the 3D video frame. In this regard, for example, different filters may be employed for different regions of the enhancement layer based on the video that is associated with each of the regions and/or the video of each of the corresponding regions of the encoded base layer.

The transport multiplexer 208 may be operable to transmit the encoded base layer of the 3D video frame and the encoded enhancement layer of the 3D video frame to a 3D video receiver such as the 3D video receiver 130 via a transport stream such as the transport stream 120. The transport multiplexer 208 may also be operable to transmit modification information such as, for example, filters information that may be associated with the modified enhancement layer of the 3D video frame to the 3D video receiver 130.

Figure 3:
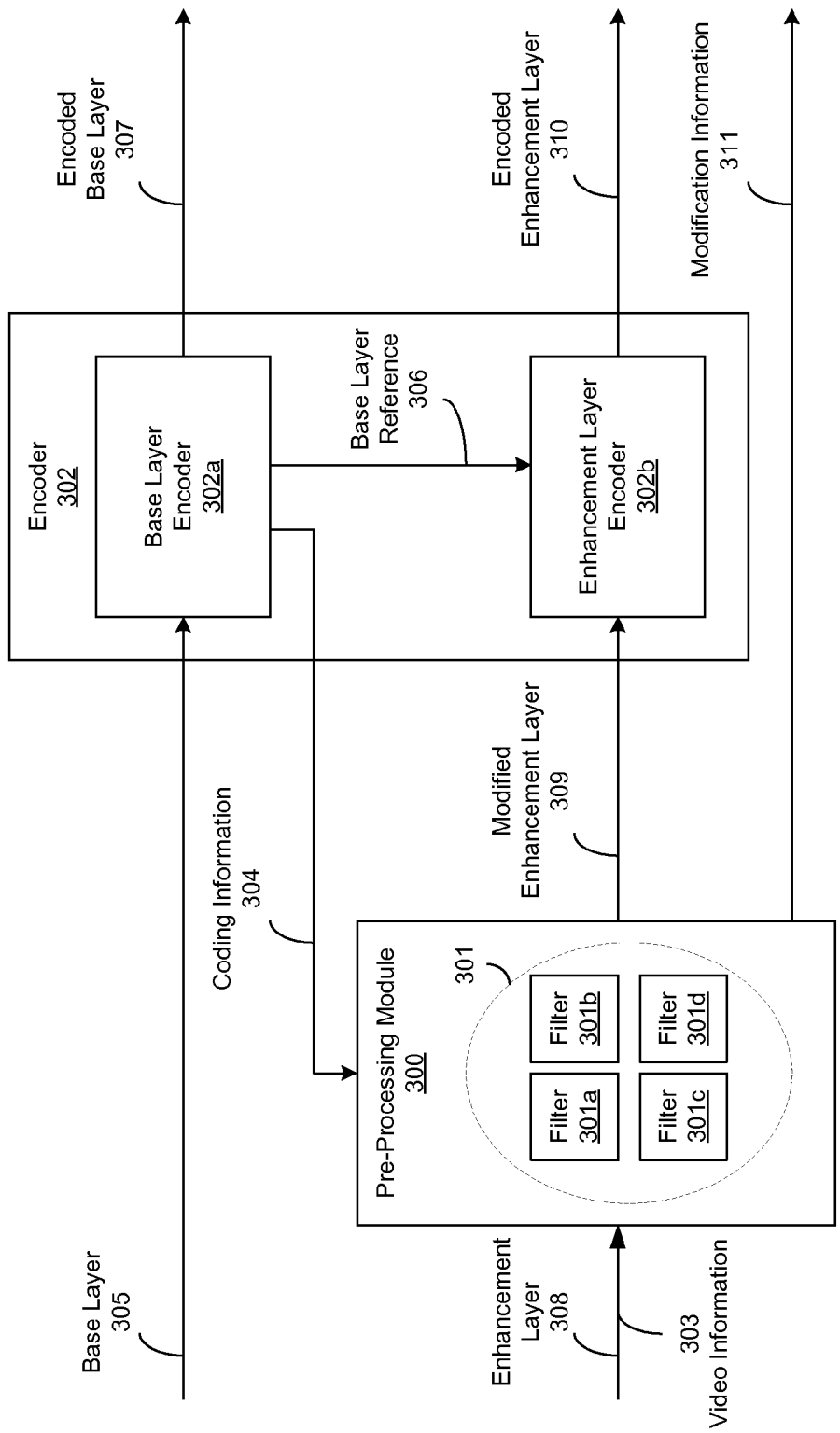
FIG. 3 is a block diagram illustrating an exemplary pre-processing module that is operable to provide 3D video pre-processing, in accordance with an embodiment of the invention.

FIG. 3 is a block diagram illustrating an exemplary pre-processing module that is operable to provide 3D video pre-processing, in accordance with an embodiment of the invention. Referring to FIG. 3, there is shown a pre-processing module 300 and an encoder 302. The pre-processing module 300, which may be substantially similar to the pre-processing module 206 in FIG. 2, may comprise a plurality of filters 301 of which filters 301a-301d are illustrated. The encoder 302, which may be substantially similar to the encoder 204 in FIG. 2, may comprise a base layer encoder 302a and an enhancement layer encoder 302b.

The base layer encoder 302a may comprise suitable logic, circuitry, interfaces and/or code that may be operable to encode a base layer of a 3D video frame such as the base layer 305 to generate an encoded base layer such as the encoded base layer 307. The base layer encoder 302a may be operable to provide a base layer reference such as the base layer reference 306 to the enhancement layer encoder 302b for an inter-layer processing such as, for example, an inter-layer prediction. In an exemplary embodiment of the invention, the base layer encoder 302a may be operable to provide coding information 304 associated with the encoded base layer 307 to the pre-processing module 300. The coding information 304 may be utilized by the pre-processing module 300 to determine a modification process for an enhancement layer such as the enhancement layer 308 of the 3D video frame before the encoding of the enhancement layer 308.

The enhancement layer encoder 302b may comprise suitable logic, circuitry, interfaces and/or code that may be operable to encode a modified enhancement layer of a 3D video frame such as the modified enhancement layer 309 to generate an encoded enhancement layer such as the encoded enhancement layer 310. The modified enhancement layer 309 may be received from the pre-processing module 300.

In operation, the base layer encoder 302a may be operable to encode the base layer 305 of the 3D video frame to generate the encoded base layer 307. The pre-processing module 300 may be operable to receive the enhancement layer 308 of the 3D video frame. In an exemplary embodiment of the invention, the pre-processing module 300 may be operable to determine one or more filters such as the filters 301a-301d to be utilized on one or more regions of the enhancement layer 308 of the 3D video frame. For example, the one or more regions may comprise a plurality of macroblocks. The one or more regions of the enhancement layer 308 of the 3D video frame may then be modified by the pre-processing module 300 utilizing the determined one or more filters 301a-301d. In this regard, for example, the one or more filters 301a-301d to be utilized on the one or more regions of the enhancement layer 308 may be determined based on video information 303 associated with each of the one or more regions of the enhancement layer 308. The one or more filters 301a-301d to be utilized on one or more regions of the enhancement layer 308 may also be determined based on coding information 304 associated with each of the one or more corresponding regions of the encoded base layer 307 of the 3D video frame. In this regard, for example, different filters 301a-301d may be employed for different regions of the enhancement layer 308 based on the video of each of the regions. Different filters 301a-301d may also be employed for different regions of the enhancement layer 308 based on, for example, the video of each of the corresponding regions of the encoded base layer 307 and/or parameters that may be utilized to encode each of the corresponding regions of the encoded base layer 307.

The modified enhancement layer 309, which may be generated by the pre-processing module 300 utilizing the one or more filters 301a-301d, may be encoded by the enhancement layer encoder 302b to generate the encoded enhancement layer 310. In an exemplary embodiment of the invention, the pre-processing module 300 may be operable to provide modification information such as the modification information 311 that may be associated with the modified enhancement layer 309. The modification information 311 such as, for example, information for the filters may then be transmitted, along with the encoded base layer 307 and the encoded enhancement layer 310, to a 3D video receiver such as the 3D video receiver 130. Exemplary filter information may comprise filter coefficients.

In an embodiment of the invention, the enhancement layer 308, the modified enhancement layer 309 and the base layer 305 of the 3D video frame may comprise the same resolution or format. In another embodiment of the invention, the original enhancement layer 308, the modified enhancement layer 309 and the base layer 305 of the 3D video frame may comprise different resolutions or formats. For example, the base layer 305, which may be a left view, may comprise 1000 pixels wide. The enhancement layer 308, which may be a right view, may comprise 500 pixels wide. The modified enhancement layer 309 may result in a 750 pixels wide image. The 750 pixels wide of the modified enhancement layer 309 may be achieved by using filters that output 3 pixels for every 2 pixels, for example. In this regard, the resolution of the right view image may not be as well encoded and may be blurrier comparing to the left view image. However, when a full 3D image is created and presented, the blurry effect may not be noticeable.

Figure 4:
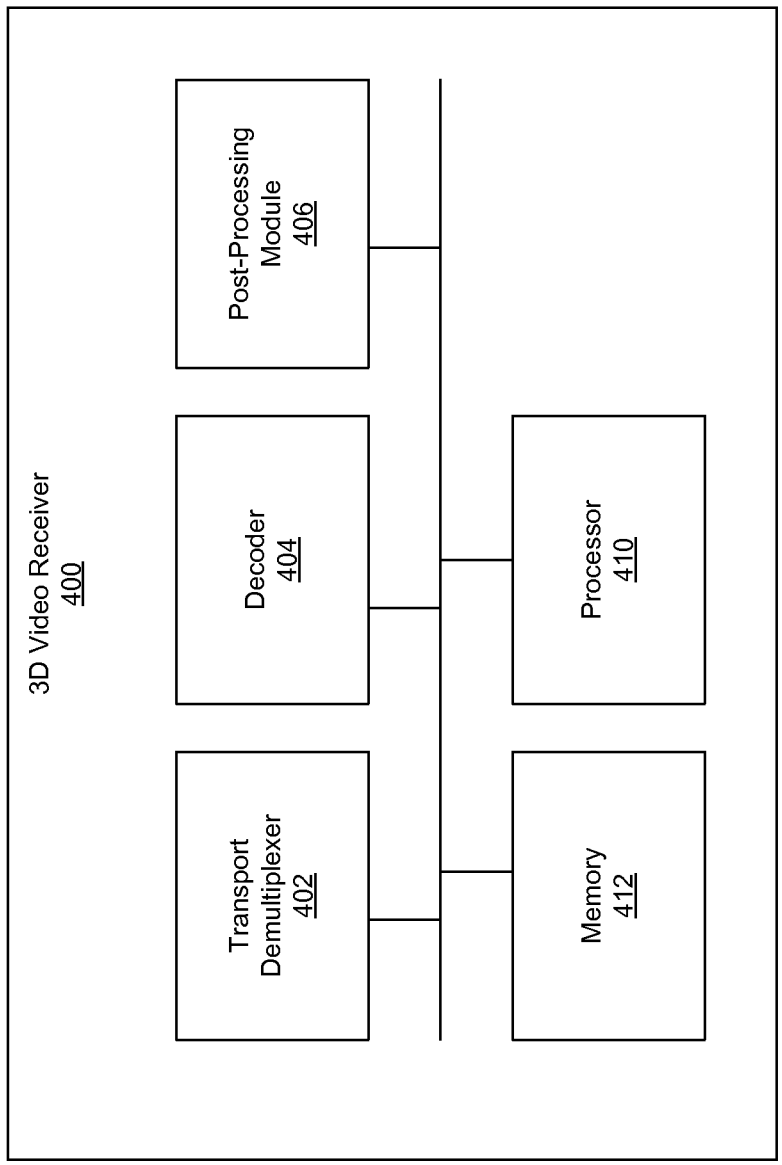
FIG. 4 is a block diagram illustrating an exemplary 3D video receiver that is operable to provide 3D video pre-processing and post-processing, in accordance with an embodiment of the invention.

FIG. 4 is a block diagram illustrating an exemplary 3D video receiver that is operable to provide 3D video pre-processing and post-processing, in accordance with an embodiment of the invention. Referring to FIG. 4, there is shown a 3D video receiver 400. The 3D video receiver 400 may comprise a transport demultiplexer 402, a decoder 404, a post-processing module 406, a processor 410 and a memory 412.

The transport demultiplexer 402 may comprise suitable logic, circuitry, interfaces and/or code that may be operable to receive a 3D video stream such as the transport stream 120 from a 3D video transmitter such as the 3D video transmitter 110. The received 3D video stream may comprise an encoded base layer such as the encoded base layer 307 and an encoded enhancement layer such as the encoded enhancement layer 310. The transport demultiplexer 402 may be operable to demultiplex and/or parse the received 3D video stream for decoding by the decoder 404. In an exemplary embodiment of the invention, the transport demultiplexer 402 may also receive, from the 3D video transmitter 110 via the transport stream 120, modification information such as the modification information 311 that may be utilized by the post-processing module 406 for recovering an original image of an enhancement layer of a 3D video frame.

The decoder 404 may comprise suitable logic, circuitry, interfaces and/or code that may be operable to decode or decompressed encoded 3D video which may be received form the transport demultiplexer 402. In an exemplary embodiment of the invention, the decoder 404 may be operable to decode the encoded base layer 307 and the encoded enhancement layer 310.

The post-processing module 406 may comprise suitable logic, circuitry, interfaces and/or code that may be operable to modify a decoded enhancement layer of a 3D video frame based on the received modification information 311 such as, for example, filters information so as to recover an original image of the enhancement layer 308 of the 3D video frame.

The processor 410 may comprise suitable logic, circuitry, interfaces and/or code that may be operable to communicate with the transport demultiplexer 402, the decoder 404 and the post-processing module 406 to perform various functions of the 3D video receiver 400.

The memory 412 may comprise suitable logic, circuitry, interfaces and/or code that may be operable to store information such as executable instructions and data that may be utilized by the processor 410, the transport demultiplexer 402, the decoder 404 and/or the post-processing module 406 to perform various functions of the 3D video receiver 400.

In operation, the transport demultiplexer 402 may be operable to receive an encoded base layer 307, an encoded enhancement layer 310 and/or modification information 311. The decoder 404 may be operable to decode the received encoded base layer 307 to generate a decoded base layer and decode the received encoded enhancement layer 310 to generate a decoded enhancement layer. The post-processing module 406 may be operable to modify the decoded enhancement layer of a 3D video frame based on the received modification information 311 such as, for example, information for the filters so as to recover an original image of the enhancement layer. In this regard, for example, the post-processing module 406 may be operable to utilize one or more corresponding inverse filters, based on the filters information, to modify the decoded enhancement layer so as to recover the original image of the enhancement layer 308 of the 3D video frame.

Figure 5:
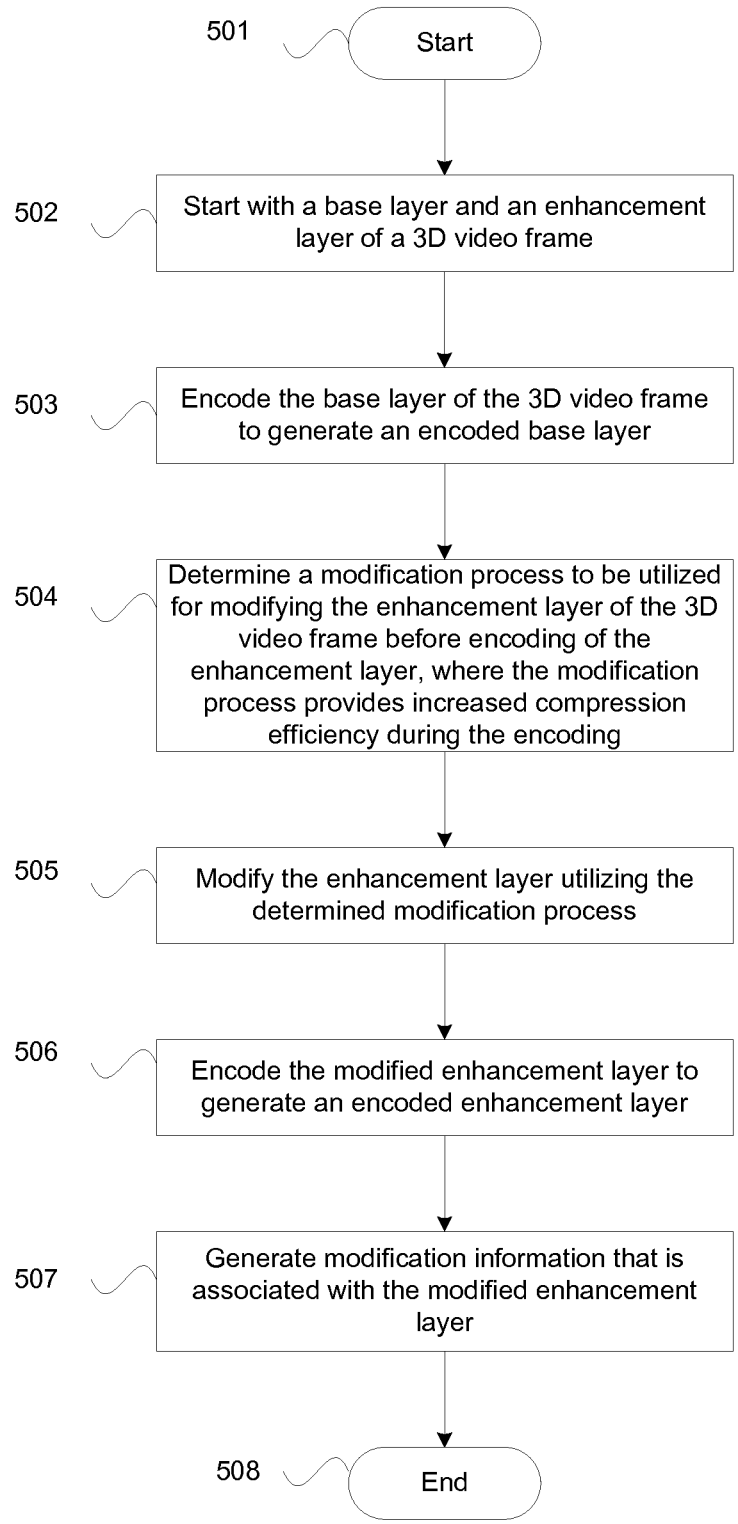
FIG. 5 is a flow chart illustrating exemplary steps for 3D video pre-processing, in accordance with an embodiment of the invention.

FIG. 5 is a flow chart illustrating exemplary steps for 3D video pre-processing, in accordance with an embodiment of the invention. Referring to FIG. 5, the exemplary steps start at step 501. In step 502, the 3D video transmitter 200 may be operable to start with a base layer 305 and an enhancement layer 308 of a 3D video frame. In step 503, the encoder 204 in the 3D video transmitter 200 may be operable to encode the base layer 305 of the 3D video frame to generate an encoded base layer 307. In step 504, the pre-processing module 206 in the 3D video transmitter 200 may be operable to determine a modification process to be utilized for modifying the enhancement layer 308 of the 3D video frame before encoding of the enhancement layer 308. The modification process may provide increased compression efficiency during the encoding. In step 505, the pre-processing module 206 may be operable to modify the enhancement layer 308 utilizing the determined modification process. In step 506, the encoder 204 may be operable to encode the modified enhancement layer 309 to generate an encoded enhancement layer 310. In step 507, the pre-processing module 206 may be operable to generate modification information 311 that may be associated with the modified enhancement layer 309. The exemplary steps may proceed to the end step 508.

Figure 6:
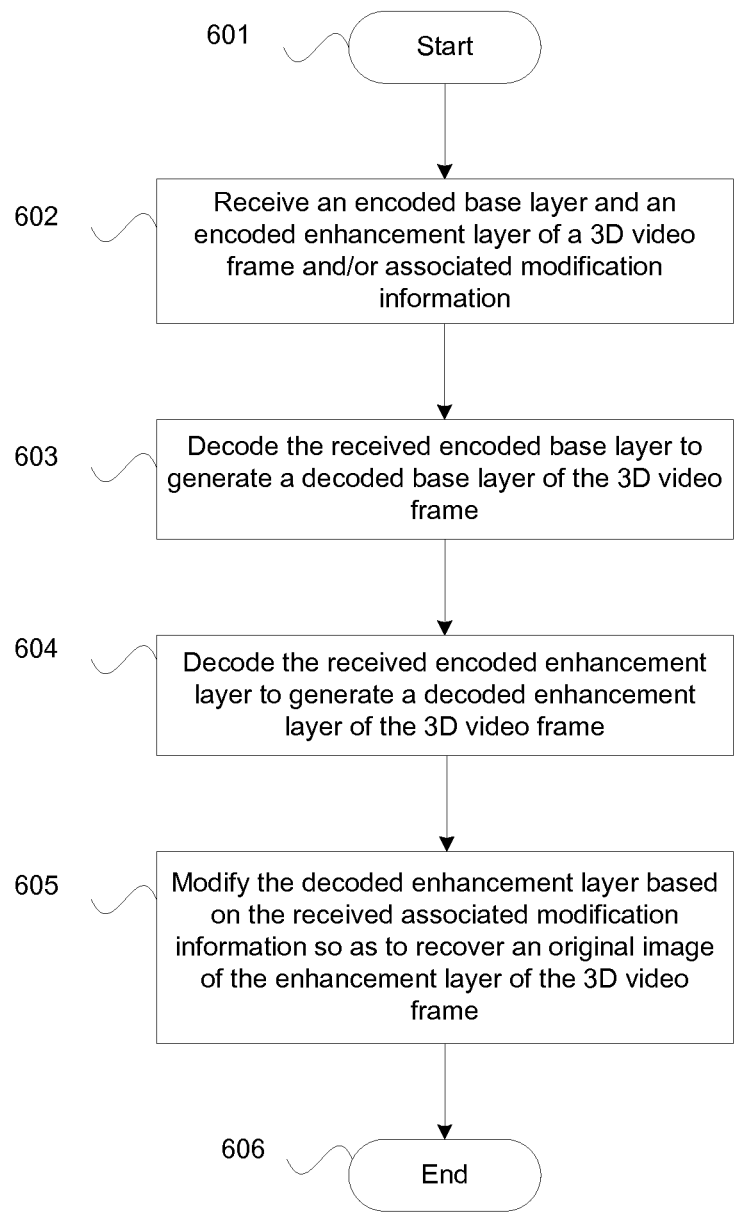
FIG. 6 is a flow chart illustrating exemplary steps for 3D video post-processing, in accordance with an embodiment of the invention.

FIG. 6 is a flow chart illustrating exemplary steps for 3D video post-processing, in accordance with an embodiment of the invention. Referring to FIG. 6, the exemplary steps start at step 601. In step 602, the transport demultiplexer 402 in the 3D video receiver 400 may be operable to receive an encoded base layer 307 and an encoded enhancement layer 310 of a 3D video frame and/or associated modification information 311. In step 603, the decoder 404 may be operable to decode the received encoded base layer 307 to generate a decoded base layer of the 3D video frame. In step 604, the decoder 404 may be operable to decode the received encoded enhancement layer 310 to generate a decoded enhancement layer of the 3D video frame. In step 605, the post-processing module 406 may be operable to modify the decoded enhancement layer based on the received associated modification information 311 so as to recover an original image of the enhancement layer 308 of the 3D video frame. The exemplary steps may proceed to the end step 606.

In various embodiments of the invention, a pre-processing module 206 in a 3D video transmitter 200 may be operable to determine a modification process to be utilized for modifying an enhancement layer 308 of a 3D video frame before encoding of the enhancement layer 308 of the 3D video frame. The modification process may provide increased compression efficiency during the encoding. The enhancement layer 308 of the 3D video frame may be modified by the pre-processing module 206 utilizing the determined modification process. The modified enhancement layer 309 of the 3D video frame may then be encoded by an encoder 204 in the 3D video transmitter 200. In this regard, the modification process for the enhancement layer 308 of the 3D video frame may be determined based on, for example, video information 303 associated with the enhancement layer 308 of the 3D video frame and/or coding information 304 associated with an encoded base layer 307 of the 3D video frame.

In an exemplary embodiment of the invention, the pre-processing module 300 may be operable to determine one or more filters 301*a*-301*d* to be utilized on one or more regions of the enhancement layer 308 of the 3D video frame. The one or more regions may comprise, for example, a plurality of macroblocks. The one or more regions of the enhancement layer 308 of the 3D video frame may then be modified by the pre-processing module 300 utilizing the determined one or more filters 301*a*-301*d*. In this regard, for example, the one or more filters 301*a*-301*d* to be utilized on the one or more regions of the enhancement layer 308 may be determined based on video information 303 associated with each of the one or more regions of the enhancement layer 308. The one or more filters 301*a*-301*d* to be utilized on the one or more regions of the enhancement layer 308 may also be determined based on coding information 304 associated with each of the one or more corresponding regions of the encoded base layer 307 of the 3D video frame.

The 3D video transmitter 110 may be operable to transmit the encoded base layer 307 of the 3D video frame and the encoded enhancement layer 310 of the 3D video frame to a 3D video receiver 130. The 3D video transmitter 110 may also be operable to transmit modification information 311 associated with the modified enhancement layer 309 of the 3D video frame to the 3D video receiver 130. In this regard, a decoder 404 in the 3D video receiver 400 may decode the transmitted encoded base layer 307 and the transmitted encoded enhancement layer 310 of the 3D video frame. A post-processing module 406 in the 3D video receiver 400 may then modify the decoded enhancement layer of the 3D video frame, based on the transmitted modification information 311, so as to recover an original image of the enhancement layer 308 of the 3D video frame.

In an embodiment of the invention, the original enhancement layer 308, the modified enhancement layer 309 and the base layer 305 of the 3D video frame may comprise the same resolution or format. In another embodiment of the invention, the original enhancement layer 308, the modified enhancement layer 309 and the base layer 305 of the 3D video frame may comprise different resolutions or formats.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for 3D video pre-processing and post-processing.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video, the method comprising:
   determining, for each of a plurality of regions of a 3-dimensional (3D) video frame, a modification process to be utilized for modifying an enhancement layer of said 3D video frame based on coding information of a corresponding region of a base layer of said 3D video frame;
   modifying, by at least one processor, circuit, or combination thereof in a 3D video transmitter, said enhancement layer of said 3D video frame according to said determining a modification process; and
   encoding said modified enhancement layer of said 3D video frame.

2. The method according to claim 1, wherein:
   said modification process provides increased compression efficiency during said encoding; and
   said determining a modification process further comprises determining said modification process based on video information associated with said enhancement layer of said 3D video frame.

3. The method according to claim 1, comprising:
   encoding each of a plurality of regions of said base layer of said 3D video frame to provide a base layer reference for inter-layer prediction and coding information for each of said plurality of regions of said base layer, wherein
   determining a modification process further comprises determining said modification process based on said coding information for said plurality of regions of said base layer.

4. The method according to claim 1, comprising determining one or more filters to be utilized on one or more regions of said enhancement layer of said 3D video frame.

5. The method according to claim 4, comprising modifying said one or more regions of said enhancement layer of said 3D video frame utilizing said determined one or more filters.

6. The method according to claim 1, comprising determining one or more filters to be utilized on one or more regions of said enhancement layer of said 3D video frame based on video information associated with each of said one or more regions of said enhancement layer of said 3D video frame.

7. The method according to claim 1, comprising:
   encoding each of a plurality of regions of said base layer of said 3D video frame to provide a base layer reference for inter-layer prediction and coding information for each of said plurality of regions of said base layer; and
   determining a plurality of filters to be utilized on regions of said enhancement layer of said 3D video frame based on said coding information for said plurality of regions of said base layer.

8. The method according to claim 1, wherein modifying said enhancement layer further comprises generating modification information including filter coefficients associated with said modified enhancement layer.

9. The method according to claim 8, comprising transmitting an encoded base layer of said 3D video frame, said encoded modified enhancement layer of said 3D video frame, and said modification information to a 3D video receiver.

10. The method according to claim 9, further comprising:
    decoding, by said 3D video receiver, said transmitted encoded base layer of said 3D video frame and said transmitted encoded modified enhancement layer of said 3D video frame; and
    modifying said decoded modified enhancement layer of said 3D video frame based on said transmitted modification information to recover an original image of said enhancement layer of said 3D video frame.

11. A system for processing video, the system comprising:
    at least one processor, circuit, or combination thereof in a 3-dimensional (3D) video transmitter, said at least one processor, circuit, or combination thereof being operable to:
    determine, for each of a plurality of regions of a 3D video frame, a modification process to be utilized for modifying an enhancement layer of said 3D video frame based on coding information of a corresponding region of a base layer of said 3D video frame;
    modify said enhancement layer of said 3D video frame according to said determined modification process; and
    encode said modified enhancement layer of said 3D video frame.

12. The system according to claim 11, wherein:
    said modification process provides increased compression efficiency during said encoding; and said at least one processor, circuit, or combination thereof is further operable to determine said modification process based on video information associated with said enhancement layer of said 3D video frame.

13. The system according to claim 11, wherein said at least one processor, circuit, or combination thereof is further operable to:
encode each of a plurality of regions of said base layer of said 3D video frame to provide a base layer reference for inter-layer prediction and coding information for each of said plurality of regions of said base layer; and
determine said modification process based on said coding information for said plurality of regions of said base layer.

14. The system according to claim 11, wherein said at least one processor, circuit, or combination thereof is further operable to determine one or more filters to be utilized on one or more regions of said enhancement layer of said 3D video frame.

15. The system according to claim 14, wherein said at least one processor, circuit, or combination thereof is further operable to modify said one or more regions of said enhancement layer of said 3D video frame utilizing said determined one or more filters.

16. The system according to claim 11, wherein said at least one processor, circuit, or combination thereof is further operable to determine one or more filters to be utilized on one or more regions of said enhancement layer of said 3D video frame based on video information associated with each of said one or more regions of said enhancement layer of said 3D video frame.

17. The system according to claim 11, wherein said at least one processor, circuit, or combination thereof is further operable to:
encode each of a plurality of regions of said base layer of said 3D video frame to provide a base layer reference for inter-layer prediction and coding information for each of said plurality of regions of said base layer; and
determine a plurality of filters to be utilized on regions of said enhancement layer of said 3D video frame based on said coding information for said plurality of regions of said base layer.

18. The system according to claim 11, wherein said at least one processor, circuit, or combination thereof is further operable to generate modification information including filter coefficients associated with said modified enhancement layer.

19. The system according to claim 18, wherein said at least one processor, circuit, or combination thereof is further operable to transmit an encoded base layer of said 3D video frame, said encoded modified enhancement layer of said 3D video frame, and said modification information to a 3D video receiver.

20. The system according to claim 19, further comprising:
at least one processor, circuit, or combination thereof in said 3D video receiver, said at least one processor, circuit, or combination thereof in said 3D video receive being operable to:
decode said transmitted encoded base layer of said 3D video frame and said transmitted modified encoded enhancement layer of said 3D video frame; and
modify said decoded modified enhancement layer of said 3D video frame based on said transmitted modification information to recover an original image of said enhancement layer of said 3D video frame.

21. A method for processing video, the method comprising:
encoding each of a plurality of regions of a base layer of a 3D video frame to provide coding information for each of said plurality of regions of said base layer;
determining, for each of a plurality of regions of a 3D video frame, a modification process to be utilized for modifying an enhancement layer of said 3D video frame based on coding information for respective regions of said base layer; and
modifying, by at least one processor, circuit, or combination thereof, said enhancement layer of said 3D video frame according to said determining a modification process.

22. The method according to claim 21, wherein modifying said enhancement layer further comprises generating modification information including filter coefficients associated with said modified enhancement layer.

23. The method according to claim 22, comprising transmitting said encoded base layer of said 3D video frame, said modified enhancement layer of said 3D video frame, and said modification information to a 3D video receiver.

* * * * *